(12) United States Patent
Sadakane et al.

(10) Patent No.: US 10,814,591 B2
(45) Date of Patent: Oct. 27, 2020

(54) LAMINATED GLASS

(71) Applicant: AGC Inc., Chiyoda-ku (JP)

(72) Inventors: Shunsuke Sadakane, Chiyoda-ku (JP); Tokihiko Aoki, Chiyoda-ku (JP); Ayaka Ikegami, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/149,287

(22) Filed: Oct. 2, 2018

(65) Prior Publication Data

US 2019/0033587 A1 Jan. 31, 2019

Related U.S. Application Data

(63) Continuation of application No. PCT/JP2017/012917, filed on Mar. 29, 2017.

(30) Foreign Application Priority Data

Apr. 7, 2016 (JP) ................................. 2016-077280

(51) Int. Cl.
*B32B 17/10* (2006.01)
*B60J 1/02* (2006.01)
(Continued)

(52) U.S. Cl.
CPC .. *B32B 17/10568* (2013.01); *B32B 17/10036* (2013.01); *B32B 17/10541* (2013.01);
(Continued)

(58) Field of Classification Search
CPC ........ B32B 17/10559; B32B 17/10568; B32B 17/10–10798; B60K 2370/1529;
(Continued)

(56) References Cited

U.S. PATENT DOCUMENTS 5,812,332 A * 9/1998 Freeman ................... B32B 3/02
359/894
6,414,796 B1 7/2002 Muromachi et al.
(Continued)

FOREIGN PATENT DOCUMENTS

JP 2011-505330 2/2011
JP 2014-024752 A 2/2014
(Continued)

OTHER PUBLICATIONS

International Search Report dated Jun. 20, 2017 in PCT/JP2017/012917 filed Mar. 29, 2017 (with English Translation).
(Continued)

*Primary Examiner* — Z. Jim Yang
(74) *Attorney, Agent, or Firm* — Element IP, PLC

(57) ABSTRACT

A laminated glass includes a first glass plate; a second glass plate; and an intermediate film positioned between the first and second glass plates, and configured to be bonded to the first and second glass plates. The laminated glass includes a plurality of display areas used for a head-up display. The plurality of display areas include first and second display areas, on which virtual images having different image distances are displayed. At least one of the first and second display areas has a cross section having a wedge shape, in which a thickness of an upper edge is greater than that of a lower edge. Average wedge angles of the first and second display areas are different from each other. The first and second display areas are arranged with a predetermined distance therebetween in a vertical direction along the laminated glass, when the laminated glass is installed in a vehicle.

16 Claims, 4 Drawing Sheets

(51) Int. Cl.
  *G02B 27/01* (2006.01)
  *B60K 35/00* (2006.01)
(52) U.S. Cl.
  CPC .......... *B60J 1/02* (2013.01); *B32B 2307/732* (2013.01); *B32B 2605/006* (2013.01); *B32B 2605/08* (2013.01); *B60K 35/00* (2013.01); *B60K 2370/334* (2019.05); *G02B 27/01* (2013.01); *G02B 2027/0121* (2013.01)
(58) Field of Classification Search
  CPC .......... B60K 2370/155; B60J 1/02–06; G02B 27/0018; G02B 27/0101; G02B 27/012; G02B 27/0121
  See application file for complete search history.

(56) References Cited

U.S. PATENT DOCUMENTS

| | | | |
|---|---|---|---|
| 7,846,532 | B2 | 12/2010 | Lu et al. |
| 9,915,822 | B2 | 3/2018 | Arndt et al. |
| 10,175,480 | B2 | 1/2019 | Zhao et al. |
| 2001/0044010 | A1 | 11/2001 | Freeman |
| 2002/0008926 | A1 | 1/2002 | Freeman |
| 2003/0026964 | A1 | 2/2003 | Muromachi et al. |
| 2003/0215610 | A1* | 11/2003 | DiGiampaolo ......... C03B 18/06 428/156 |
| 2004/0109251 | A1 | 6/2004 | Freeman |
| 2005/0158520 | A1 | 7/2005 | Freeman |
| 2007/0009714 | A1* | 1/2007 | Lee ..................... B32B 2367/00 428/172 |
| 2007/0148472 | A1 | 6/2007 | Masaki et al. |
| 2010/0112267 | A1* | 5/2010 | Stenzel .................. B29C 45/16 428/60 |
| 2010/0314900 | A1* | 12/2010 | Labrot .............. B32B 17/10036 296/90 |
| 2012/0070624 | A1* | 3/2012 | Payen ................. C03B 23/0252 428/172 |
| 2013/0342913 | A1 | 12/2013 | Tsimhoni et al. |
| 2015/0251377 | A1 | 9/2015 | Cleary et al. |
| 2016/0163108 | A1 | 6/2016 | Kim |
| 2016/0168353 | A1* | 6/2016 | Spangler ........... B32B 17/10761 428/172 |
| 2016/0291324 | A1 | 10/2016 | Arndt et al. |
| 2017/0003503 | A1* | 1/2017 | Arndt ................ B32B 17/10568 |
| 2017/0017079 | A1* | 1/2017 | Zhao .................. G02B 27/0101 |
| 2017/0072663 | A1 | 3/2017 | Sadakane et al. |
| 2017/0274631 | A1 | 9/2017 | Oota et al. |
| 2017/0285339 | A1* | 10/2017 | Spangler ........... B32B 17/10568 |
| 2017/0313032 | A1 | 11/2017 | Arndt et al. |
| 2017/0341491 | A1* | 11/2017 | Nakagawa .......... C03C 17/3681 |
| 2017/0343806 | A1 | 11/2017 | Anzai et al. |
| 2017/0343809 | A1 | 11/2017 | Benesh et al. |
| 2017/0361578 | A1* | 12/2017 | Karagiannis ............ B32B 27/22 |
| 2017/0363863 | A1 | 12/2017 | Chen |
| 2017/0364029 | A1 | 12/2017 | Cho et al. |
| 2018/0149865 | A1* | 5/2018 | Arndt ..................... G02B 27/01 |
| 2018/0149867 | A1* | 5/2018 | Kremers ........... B32B 17/10137 |
| 2018/0284430 | A1* | 10/2018 | Chen ................ B32B 17/10761 |
| 2018/0326706 | A1* | 11/2018 | Oota ..................... B32B 27/306 |
| 2018/0341110 | A1 | 11/2018 | Hirata et al. |
| 2019/0033587 | A1 | 1/2019 | Sadakane et al. |

FOREIGN PATENT DOCUMENTS

| | | |
|---|---|---|
| JP | WO 2016/017566 A1 | 2/2016 |
| WO | WO 2015/086234 A1 | 6/2015 |
| WO | WO 2015/134836 A1 | 9/2015 |
| WO | WO 2016/091435 A1 | 6/2016 |
| WO | WO 2017/175639 A1 | 10/2017 |

OTHER PUBLICATIONS

Written Opinion dated Jun. 20, 2017 in PCT/JP2017/012917 filed Mar. 29, 2017.
Office Action dated Aug. 30, 2018 in U.S. Appl. No. 15/641,446 (now U.S. Pat. No. 10,353,200), 13 pgs.
Office Action dated Dec. 21, 2018 in U.S. Appl. No. 15/641,446 (now U.S. Pat. No. 10,353,200), 14 pgs.
Notice of Allowance dated Mar. 6, 2019 in U.S. Appl. No. 15/641,446 (now U.S. Pat. No. 10,353,200), 9 pgs.

\* cited by examiner

LAMINATED GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/012917 filed on Mar. 29, 2017 and designating the U.S., which claims priority of Japanese Patent Application No. 2016-077280 filed on Apr. 7, 2016. The entire contents of the foregoing applications are incorporated herein by reference.

BACKGROUND OF THE INVENTION

1. Field of the Invention

The disclosure herein generally relates to a laminated glass.

2. Description of the Related Art

In recent years, head-up displays (in the following, referred to as an "HUD"), in which an image is reflected on a front windshield of a vehicle so that predetermined information is displayed in a driver's view, have been introduced. However, for driver viewing of a view outside the vehicle or of the information displayed by the HUD, there may be a case where a double image is a problem.

A double image that becomes a problem for a driver of a vehicle includes a transmitted double image and a reflected double image. When the front windshield includes a display area used for the HUD and an area outside the display area (transparent area) that is not used for the HUD, although a transmitted double image may be a problem in the display area, generally a reflected double image is the main problem; and, in the area outside the display area, a transmitted double image is a problem.

It has been known that such a reflected double image or transmitted double image can be reduced by using, for a front windshield, a laminated glass having a cross section that has a wedge shape, viewed from the horizontal direction. For example, a laminated glass obtained by holding with two glass plates an intermediate film to have a cross section that has a wedge shape as a whole has been proposed (See, for example, Japanese Translation of PCT International Application Publication No. JP-2011-505330).

SUMMARY OF THE INVENTION

Technical Problem

In the case where a plurality of display areas for displaying virtual images with different image distances are present, wedge angles required for the respective display areas are different from each other. However, there are regions in which wedge angles greatly change between the respective display areas locally, and there is a problem that a reflected double image is liable to be visually recognized by a driver.

The present invention was made in view of such a problem, and it is an object of the present invention to provide a laminated glass having a plurality of display areas for displaying virtual images with different image distances, in which a reflected double image is difficult to be visually recognized by a driver.

Solution to Problem

According to an aspect of the present invention, a laminated glass includes a first glass plate;

a second glass plate; and an intermediate film positioned between the first glass plate and the second glass plate, and configured to be bonded to the first glass plate and to the second glass plate.

The laminated glass further includes a plurality of display areas used for a head-up display.

The plurality of display areas include a first display area and a second display area, on which virtual images having different image distances are displayed.

At least one of the first display area and the second display area has a cross section that has a wedge shape, in which a thickness of an upper edge is greater than a thickness of a lower edge, when the laminated glass is installed in a vehicle.

An average wedge angle of the first display area is different from an average wedge angle of the second display area.

The first display area and the second display area are arranged with a predetermined distance between the first display area and the second display area in a vertical direction along the laminated glass, when the laminated glass is installed in the vehicle.

Advantageous Effect of Invention

According to an aspect of the present invention, a laminated glass having a plurality of display areas for displaying virtual images with different image distances, in which a reflected double image is difficult to be visually recognized by a driver, is provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1A:
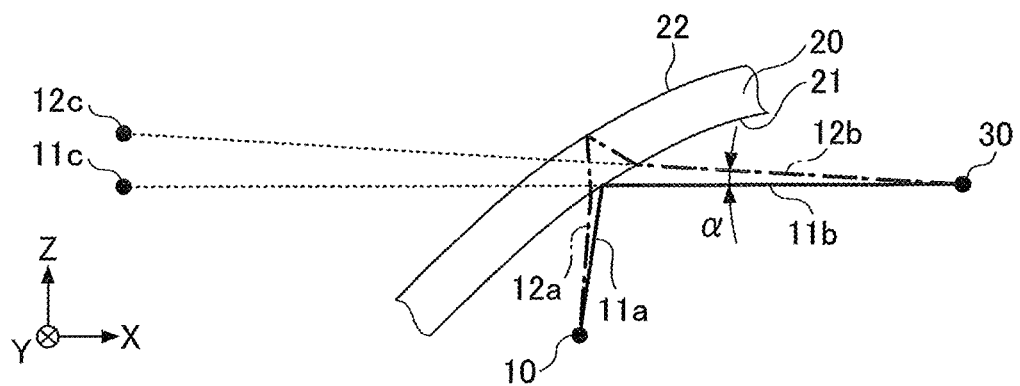
FIGS. 1A and 1B are diagrams for explaining concepts of double images.

In the following, with reference to drawings, embodiments of the present invention will be described. In each drawing, the same reference numeral is assigned to the same component, and redundant explanation will be omitted. In the following, a front windshield of a vehicle will be described as an example, but the present invention is not limited to this, and the laminated glass according to the embodiment can also be applied to other than the front windshield of the vehicle.

[Reflected Double Image, Transmitted Double Image]

Figure 1B:
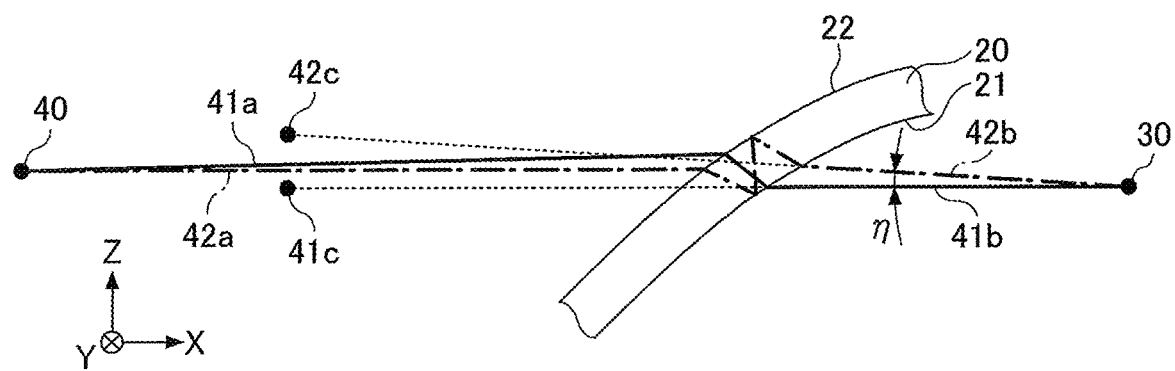

First, concepts of a reflected double image and a transmitted double image will be described. FIGS. 1A and 1B are diagrams for explaining concept of double images. FIG. 1A illustrates a reflected double image, and FIG. 1B illustrates a transmitted double image. In FIGS. 1A and 1B, a front-back direction of a vehicle in which the front windshield 20 is installed is the X-direction, a left-right direction of the vehicle is the Y-direction, and a direction perpendicular to an XY-plane is the Z-direction (The same applies to subsequent drawings).

As illustrated in FIG. 1A, a part of light beam 11a emitted from a light source 10 of an HUD is reflected on an interior surface 21 of the front windshield 20 of the vehicle, and guided to an eye 30 of a driver as a light beam 11b (primary beam), and is visually recognized by the driver as an image 11c (virtual image) in front of the front windshield 20.

Moreover, a part of light beam 12a emitted from the light source 10 of the HUD enters an interior from the interior surface 21 of the front windshield 20 of the vehicle, and is refracted. A part thereof is reflected on an exterior surface 22. Then, furthermore, the part thereof emerges from the interior surface 21 to the outside of the front windshield 20 of the vehicle by refraction, and guided to the eye 30 of the driver as a light beam 12b (secondary beam), and is visually recognized by the driver as an image 12c (virtual image).

In this way, the two images 11c and 12c visually recognized by the driver are reflected double images. Moreover, an angle between the light beam 11b (primary beam) and the light beam 12b (secondary beam) is an angle $\alpha$ of the reflected double image. The angle $\alpha$ of the reflected double image is preferably close to zero. In the present application, a reflected double image in the case where the secondary beam is viewed upwardly from the driver is defined as a positive value.

Moreover, as illustrated in FIG. 1B, a part of a light beam 41a emitted from a light source 40 enters an interior from the exterior surface 22 of the front windshield 20 of the vehicle and is refracted. Then, a part thereof emerges to the outside of the front windshield 20 from the interior surface 21 and is refracted, and guided to the eye 30 of the driver as a light beam 41b, and is visually recognized by the driver as an image 41c.

Moreover, a part of a light beam 42a emitted from the light source 40 enters an interior from the exterior surface 22 of the front windshield 20 of the vehicle and is refracted. A part thereof is reflected on the interior surface 21. Then, furthermore, the part thereof is reflected on the exterior surface 22, and furthermore a part thereof emerges to the outside of the front windshield 20 from the interior surface 21 and is refracted, and guided to the eye 30 of the driver as a light beam 42b, and is visually recognized by the driver as an image 42c.

In this way, the two images 41c and 42c visually recognized by the driver are transmitted double images. Moreover, an angle between the light beam 41b (primary beam) and the light beam 42b (secondary beam) is an angle $\eta$ of the transmitted double image. The angle $\eta$ of the transmitted double image is preferably close to zero.

[Front Windshield (Laminated Glass)]

FIG. 2 is a diagram depicting a front windshield of a vehicle, and schematically depicting a state in which the front windshield 20 is visually recognized from a vehicle interior to a vehicle exterior. Note that in FIG. 2, as a matter of convenience, a display area is indicated by a dotted pattern (satin pattern).

Moreover, the display area may also be referred to as an HUD display area.

Figure 2A:
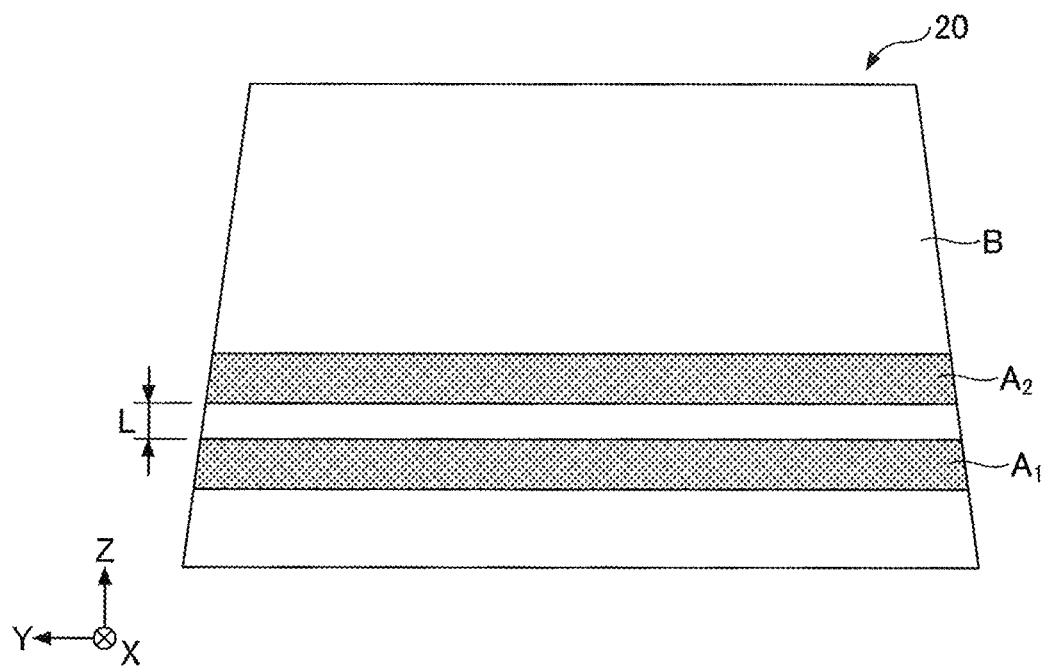
FIGS. 2A and 2B are diagrams for explaining a front windshield for a vehicle.
Figure 2B:
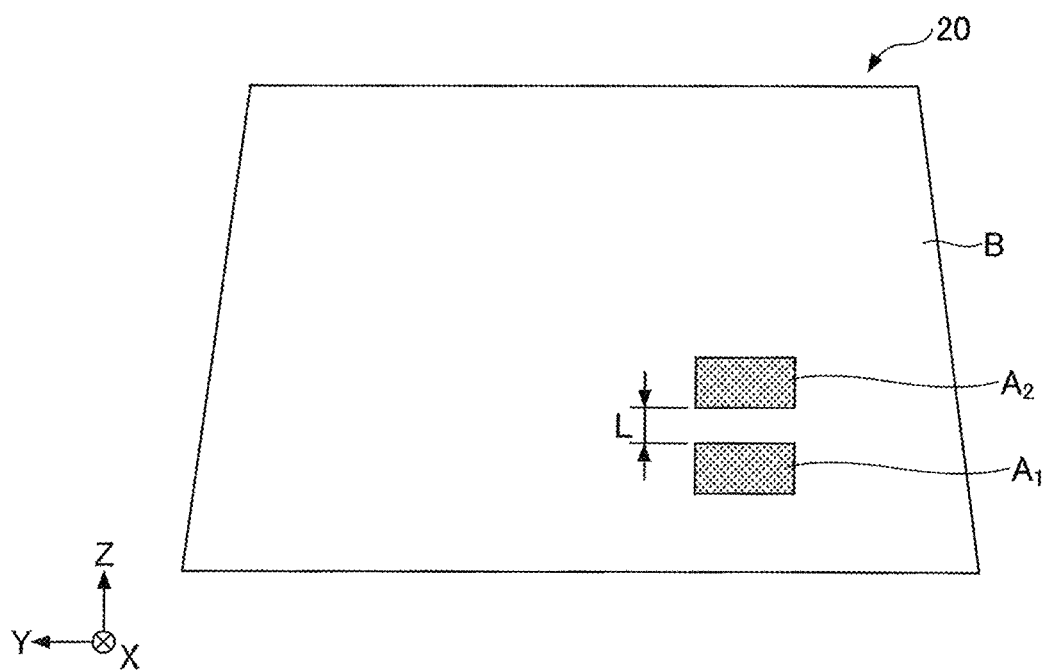

As illustrated in FIG. 2A and FIG. 2B, the front windshield 20 includes an HUD display area $A_1$ (first HUD display area) and an HUD display area $A_2$ (second HUD display area) used for the HUD, and an area outside the HUD display area B (transparent area) that is not used for the HUD. The HUD display area $A_1$ and the HUD display area $A_2$ are set to be a range in which when a mirror configuring the HUD is rotated, the front windshield 20 is irradiated with a light from the mirror configuring the HUD viewed from a V1 point defined in JIS R3212.

In the examples illustrated in FIG. 2A and FIG. 2B, when the front windshield 20 is installed in a vehicle, the HUD display area $A_1$ and the HUD display area $A_2$ are arranged along the front windshield 20, in the vertical direction, at a predetermined distance L, and so as not to contact each other. The area outside the HUD display area B is arranged adjacent to the HUD display area $A_1$ or the HUD display area $A_2$.

The HUD display areas $A_1$ and $A_2$ may be arranged over entire regions in the Y-direction, as illustrated in FIG. 2A, or both HUD display areas may be arranged in partial regions in the Y-direction, as illustrated in FIG. 2B. Alternatively, only one of the HUD display areas may be arranged in a partial region in the Y-direction. Moreover, in the case of arranging the HUD display areas in partial regions in the Y-direction, sizes of the respective regions in the Y-direction may not be the same. Moreover, in the case of arranging the HUD display areas in partial regions in the Y-direction, positions of centers of the respective regions may be shifted from each other in the Y-direction. Furthermore, the front windshield 20 may be provided with three or more HUD display areas which are arranged at predetermined distances in the vertical direction along the front windshield 20 so as not to contact each other.

Note that the HUD display area means an area on the front windshield 20, on which an image of the HUD (virtual image) can be reflected. There is a position where the image on the front windshield 20 disappears, when the image on the front windshield 20 is moved by rotating a concave mirror configuring the HUD. The position indicates a boundary between the HUD display area and the area outside the HUD display area.

The HUD display area $A_1$ and the HUD display area $A_2$ are areas in which virtual images with image distances different from each other are displayed. The imaging distance is a distance between a point of view of a driver and the virtual image. For example, the HUD display area $A_1$ is an area, on which a virtual image that is imaged near the vehicle (e.g. image distance of less than 3 m) is reflected. The HUD display area $A_2$ is an area, on which a virtual image that is imaged far from the vehicle (e.g. image distance of 3 m or more) is reflected.

For example, in the HUD display area $A_2$, a speed of the vehicle is always displayed. In the HUD display area $A_1$, a warning message is displayed only when necessary. However, display contents shown here are merely examples, and the present invention is not limited to them. Moreover, the HUD display area $A_1$ may be an area on which a virtual image that is imaged far from the vehicle (e.g. image distance of 3 m or more) is reflected. The HUD display area $A_2$ may be an area on which a virtual image that is imaged near the vehicle (e.g. image distance of less than 3 m) is reflected.

Figure 3:
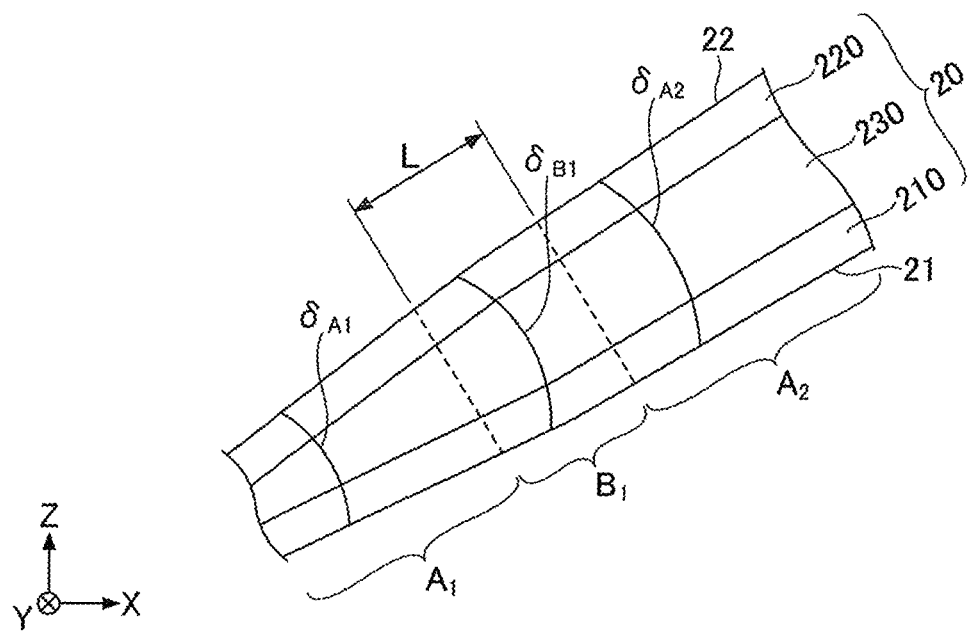
FIG. 3 is a partial cross-sectional diagram depicting the front windshield 20 illustrated in FIGS. 2A and 2B, cut along an XZ-plane, and viewed from the Y-direction.

FIG. 3 is a partial cross-sectional diagram depicting the front windshield 20 illustrated in FIGS. 2A and 2B, cut along the XZ-plane, and viewed from the Y-direction. FIG. 3 illustrates a part near the HUD display area $A_1$, a transition area $B_1$, and the HUD display area $A_2$. Note that the transition area $B_1$ is a part of the area outside the HUD display area B.

As illustrated in FIG. 3, the front windshield 20 is a laminated glass provided with a glass plate 210 that is a first glass plate, a glass plate 220 that is a second glass plate, and an intermediate film 230.

In the laminated glass, the glass plates 210 and 220 have lines generated by drawing upon manufacturing. The intermediate film 230 is located between the glass plate 210 and the glass plate 220. The intermediate film 230 is a film that bonds the glass plate 210 and the glass plate 220 so that the lines of the glass plate 210 are orthogonal to the lines of the glass plate 220.

An interior surface 21 of the front windshield 20 that is one surface of the glass plate 210 and an exterior surface 22 of the front windshield 20 that is one surface of the glass plate 220 may be flat surfaces or may be curved surfaces. The front windshield 20 may have, for example, a shape that is curved in the vertical direction.

The HUD display area $A_1$ is formed having a wedge shape in a cross-sectional view, in which a thickness changes from a lower edge toward an upper edge of the front windshield 20, when the front windshield 20 is installed in the vehicle, and a wedge angle is $\delta_{A1}$. The HUD display area $A_2$ is formed having a wedge shape in a cross-sectional view, in which a thickness changes from a lower edge toward an upper edge of the front windshield 20, when the front windshield 20 is installed in the vehicle, and a wedge angle is $\delta_{A2}$. The transition area $B_1$ is an area located between the HUD display area $A_1$ and the HUD display area $A_2$, and formed having a wedge shape in a cross-sectional view, in which a thickness changes from a lower edge toward an upper edge of the front windshield 20, when the front windshield 20 is installed in the vehicle, and a wedge angle is $\delta_{1n}$.

The wedge angle of each area can be set to a desired value by forming any one, any two, or all of the glass plate 210, the glass plate 220 and the intermediate film so as to have a wedge shape.

In the case of forming one or both of the glass plate 210 and the glass plate 220 to have a wedge shape, a condition upon manufacturing by using the float method is devised. That is, by controlling circumferential velocities of a plurality of rolls arranged on both ends in a width direction of a glass ribbon that moves on a melted metal, a cross section of a glass in the width direction may be a concave shape, a convex shape, or a tapered shape, and a part that has a desired thickness change may be cut out.

The glass plates 210 and 220 include streak-shaped fine irregularities (lines) parallel with respect to the moving direction, by an extension upon manufacturing by using the float method, respectively. Upon using as a front windshield for a vehicle, when the lines are viewed in the horizontal direction with respect to a line of sight of an observer, a distortion occurs and a visibility degrades.

As the intermediate film 230 for bonding the glass plate 210 and the glass plate 220, a thermoplastic resin is often used, including, a thermoplastic resin that has been used conventionally for this kind of purpose, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin.

Among the above-described resins, a plasticized polyvinyl acetal resin is preferably used, because of its excellence in balance of performances, such as transparency, weather resistance, strength, bond strength, resistance to penetration, absorbability for impact energy, humidity resistance, thermal insulating property, and sound insulating property. The thermoplastic resin may be used independently, or two kinds or more resins may be used concurrently. The term "plasticized" in the plasticized polyvinyl acetal resin means that the resin is made plasticized by adding a plasticizing agent. The same applies to the other plasticized resins.

The polyvinyl acetal resin includes a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. Especially, a PVB is preferable, because of its excellence in balance of performances, such as transparency, weather resistance, strength, bond strength, resistance to penetration, absorbability for impact energy, humidity resistance, thermal insulating property, and sound insulating property. The polyvinyl acetal resin may be used independently, or two kinds or more resins may be used concurrently.

Normally, a light source for HUD is located in a lower part of the vehicle interior, and projects an image toward the laminated glass. Because the projected image is reflected on the rear surface and the front surface of each of the first glass plate and the second glass plate, in order to overlay both the reflected images so as not to generate a double image, the thickness of the glass is required to vary in parallel with respect to the projection direction. Because the thickness of the glass plate 210 varies in a direction orthogonal to the lines, in order to be used as a glass, on which information is projected, the glass plate 210 must be used so that the direction of the lines is orthogonal to the projection direction, i.e. the lines are in a horizontal direction with a line of sight of an observer inside the vehicle interior (driver), and thus in a direction in which the visibility degrades.

In order to improve the visibility, the laminated glass prepared using the glass plate 210, the glass plate 220, and the intermediate film 230 are arranged so that the lines of the glass plate 210 are orthogonal to the lines of the glass plate 220. According to the above-described arrangement, the distortion, which deteriorates with use of the glass plate 210 only, will be reduced by the presence of the glass plate 220, in which the lines are orthogonal to the glass plate 210, along with the presence of the intermediate film 230 that bonds the glass plate 210 and the glass plate 220; and, the visibility is improved.

Furthermore, laminated glasses for vehicle are normally used in a state of a curved shape. The shape formation of laminated glass plates is generally performed, before the respective glass plates adhere via the intermediate film 230 to each other, by heating at a temperature of about 550° C. to 700° C., at which a glass plate becomes soft, in a shape as desired. An extent of curvature is denoted as a maximum depth of curvature, or a cross-curvature. Here, the maximum depth of curvature (cross-curvature) is a distance from a line that connects midpoints of opposite sides of the laminated glass, among the longer of the two pairs of opposite sides, to the deepest point of the curved portion, in a direction orthogonal to the line (in units of mm), where the convexly curved laminated glass is oriented such that the convex portion side directs downward.

Because streak-shaped fine irregularities occurring on a surface, which will cause a distortion when a laminated glass is formed, are expanded by a shape formation process, the greater the maximum depth of curvature (cross-curvature) is the more visibility is improved. The maximum depths of curvature of the glass plates 210 and the glass plates 220 according to the present invention are not necessarily limited, but are preferably 10 mm or more, more preferably 12 mm or more, and further preferably 15 mm or more.

Note that respective colors of the glass plates 210 and 220 are not particularly limited when the colors fall within a range that satisfies a condition: visible light transmittance (Tv)>70%. Moreover, the glass plate 220 that is an outer plate is preferably thicker than the glass plate 210 that is an inner plate. Moreover, to surfaces of the respective glass plates 210 and 220, a water-repellent coating, an antifogging coating, an ultraviolet/infrared protection coating, or the like may be imparted. Moreover, the intetmediate film 230 may include an area that is provided with a sound insulation function, an infrared shielding function, an ultraviolet shielding function, a shade band (decreasing visible light transmittance) or the like. Moreover, the front windshield 20 (laminated glass) may be an antifogging glass.

Figure 4:
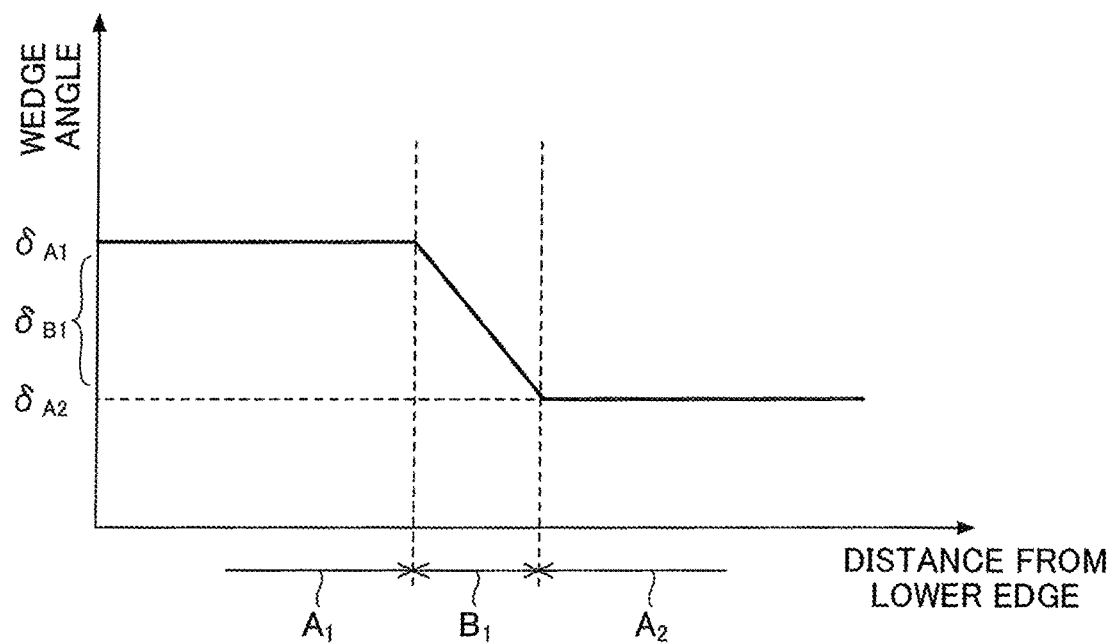
FIG. 4 is a diagram depicting an example of wedge angles of a display area $A_1$, a transition area $B_1$ and a display area $A_2$.

FIG. 4 is a diagram depicting an example of sizes of the wedge angles of the HUD display area $A_1$, the transition area $B_1$, and the HUD display area $A_2$. In FIG. 4, a horizontal axis indicates a distance from the lower edge of the front windshield 20, and a vertical axis indicates the wedge angle.

As illustrated in FIG. 4, the wedge angle $\delta_{A1}$ of the HUD display area $A_1$ and the wedge angle $\delta_{A2}$ of the HUD display area $A_2$ are set to values different from each other. This is because the HUD display area $A_1$ and the HUD display area $A_2$ are areas, in which virtual images having image distances different from each other are displayed, and optimum wedge angles for avoiding reflected double images in the respective areas are different from each other.

Note that FIG. 4 illustrates an example in which the HUD display area $A_1$ is an area, on which a virtual image that is imaged near the vehicle (e.g. image distance of less than 3 m) is displayed, and the HUD display area $A_2$ is an area, on which a virtual image that is imaged far from the vehicle (e.g. image distance of 3 m or more) is displayed. Thus, the wedge angle $\delta_{A1}$ (constant value) is set to be greater than the wedge angle $\delta_{A2}$ (constant value).

In the case where the HUD display area $A_1$ is an area, on which a virtual image that is imaged far from the vehicle (e.g. image distance of 3 m or more) is reflected, and the HUD display area $A_2$ is an area, on which a virtual image that is imaged near the vehicle (e.g. image distance of less than 3 m) is reflected, contrary to the case of FIG. 4, the wedge angle $\delta_{A1}$ (constant value) is required to be smaller than the wedge angle $\delta_{A2}$ (constant value).

In the example, illustrated in FIG. 4, the wedge angle $\delta_{A1}$ and the wedge angle $\delta_{A2}$ are set to be constant values. However, the wedge angle $\delta_{A1}$ and the wedge angle $\delta_{A2}$ are not required to be constant values. In this case, an average wedge angle of the HUD display area $A_1$ and an average wedge angle of the HUD display area $A_2$ are set to be different from each other.

When areas having wedge angles different from each other are arranged being contacted with each other, in a region where the wedge angle suddenly changes, a large reflected double image is generated. Thus, in the present embodiment, the transition area $B_1$ is arranged between the HUD display area $A_1$ and the HUD display area $A_2$, and both regions are separated by a predetermined distance L. The wedge angle gradually changes in the transition area $B_1$, from the HUD display area $A_1$ to the HUD display area $A_2$. According to the above-described configuration, the wedge angle is prevented from changing suddenly, and a large reflected double image can be prevented from occurring.

The average wedge angle is obtained by dividing a difference between a thickness of the upper edge and a thickness of the lower edge of each HUD display area in the vertical direction along the front windshield 20 by a distance between the upper edge and the lower edge in the vertical direction along the front windshield 20.

The predetermined distance L is preferably 20 mm or more. This is because an eye point movement by a driver equivalent to the predetermined distance L of 20 mm easily occurs. That is, when the predetermined distance L is 20 mm or more, eye point movement is unlikely to occur between the HUD display area $A_1$ and the HUD display area $A_2$. Thus, a strange impression to the driver, due to a plurality of images having different focal distances being viewed adjacent to each other, can be prevented.

The predetermined distance L is further preferably 30 mm or more. When the change of the wedge angle increases, a risk of transparent distortion or foaming increases. The risk can be reduced because the change of the wedge angle is decreased by setting the predetermined distance L to 30 mm or more. Moreover, when the predetermined distance L is set to 50 mm or more, or 10 mm or more, the change of the wedge angle can be made further smaller, and the risk can be further reduced.

Note that when the image distance becomes longer, providing a wedge angle in the HUD display area may become unnecessary. That is, a wedge angle may be unnecessary for a part of the plurality of HUD display areas.

Figure 5:
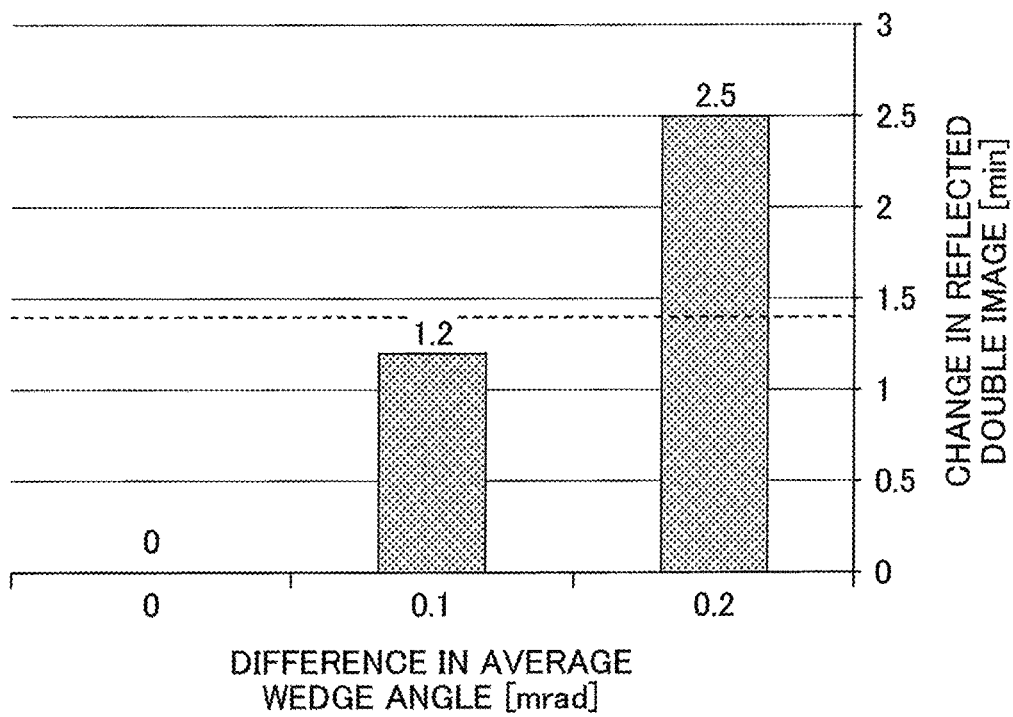
FIG. 5 is a diagram depicting an example of a relation between a difference between average wedge angles for the respective display areas and a change in a reflected double image.

FIG. 5 is a diagram depicting an example of a relation between a difference between average wedge angles for the respective HUD display areas and a change in a reflected double image. FIG. 5 shows results of calculations for the change in a reflected double image in the case where the average wedge angle of the HUD display area $A_1$ was 0.7 mrad and the average wedge angle of the HUD display area $A_2$ was 0.6 mrad (difference between the average wedge angles was 0.1 mrad), and for the change in a reflected double image in the case where the average wedge angle of the HUD display area $A_1$ was 0.7 mrad and the average wedge angle of the HUD display area $A_2$ was 0.5 mrad (difference between the average wedge angles was 0.2 mrad). Note that in both cases, the predetermined distance L was 20 mm.

From FIG. 5, the change in the reflected double image is 1.2 minutes in the case where the difference between the average wedge angles is 0.1 mrad. Moreover, in the case where the difference between the average wedge angles is 0.2 mrad, the change in the reflected double image is 2.5 minutes. Note that a dashed line in the drawing indicates a line of 1.4 minutes. The above-described term "minute" indicates a unit of angle, and is an angle of a sixtieth of one degree (The same applies hereafter).

Typically, a driver having a visual acuity resolution of 0.7, the minimum required for a regular car license in Japan (ISO 8586: 2009), may notice a reflected double image, when a change in the reflected double image of 1.4 minutes is generated according to an eye point movement corresponding to 20 mm. When the above-described property is applied to the relation illustrated in FIG. 5, in the case where the difference between the average wedge angles is 0.1 mrad, i.e. the change in the reflected double image is 1.2 minutes, the driver does not notice a reflected double image. However, in the case where the difference between the average wedge angles is 0.2 mrad, i.e. the change in the reflected double image is 2.5 minutes, the driver notices the reflected double image.

In this way, in the case where the difference between the average wedge angles is greater than 0.1 mrad, the predetermined distance L is required to be set to an appropriate distance of 20 mm or more. The appropriate distance means a distance at which the change in the reflected double image is 1.4 minutes or less, when a driver, viewing a virtual image, moves his/her eye point from the HUD display area $A_1$ to the HUD display area $A_2$.

For example, even when the difference between the average wedge angles, illustrated in FIG. 5, is 0.2 mrad, by setting the predetermined distance L to an appropriate distance of 20 mm or more, the change in the reflected double image can be made 1.4 minutes or less. Similarly, when the difference between the average wedge angles is 0.3 mrad, by setting the predetermined distance L to an appropriate distance of 20 mm or more, the change in the reflected double image can be made 1.4 minutes or less.

As described above, the preferred embodiments and the like have been described in detail. However, the present invention is not limited to the above-described specific embodiments, and various variations and modifications may be made without deviating from the scope of the present invention.

REFERENCE SIGNS LIST

10,40 light source
11a,11b,12a,12b,41a,41b,42a,42b beam
11c,12c,41c,42c image
20 front windshield
21 interior surface
22 exterior surface
30 eyes
210,220 glass plate
230 intermediate film
$A_1$, $A_2$ HUD display area
B area outside HUD display area
$B_1$ transition area
L predetermined distance
L wedge angle
$\delta_{A1}$, $\delta_{A2}$, $\delta_{B1}$ wedge angle

What is claimed is:

1. A front windshield, comprising:
    a laminated glass comprising:
        a first glass plate,
        a second glass plate, and
        an intermediate film positioned between the first glass plate and the second glass plate and bonding the first glass plate and the second glass plate,
    wherein:
    the laminated glass has:
        a first display area configured to be used by a head-up display for a first virtual image,
        a second display area configured to be used by the head-up display for a second virtual image, and
        a transition area formed between the first display area and the second display area such that the first and second virtual images have different image distances, and such that the transition area has a predetermined distance in a vertical direction along the laminated glass when the laminated glass is installed in a vehicle and separates the first display area and the second display area by the predetermined distance;
    the laminated glass has a wedge shape in a cross section in at least one of the first display area and the second display area, such that the wedge shape has an upper edge and a lower edge, and such that a thickness of the upper edge is greater than a thickness of the lower edge, when the laminated glass is installed in the vehicle;
    the laminated glass is formed such that an average wedge angle of the laminated glass in the first display area is different from an average wedge angle of the laminated glass in the second display area, and such that a difference between the average wedge angle in the first display area and the average wedge angle in the second display area is greater than 0.2 mrad;
    the first display area exists in a first partial region along a horizontal direction of the laminated glass, and the second display area exists in a second partial region along the horizontal direction of the laminated glass;
    wherein respective positions of centers of the first partial region and the second partial region are shifted from each other along the horizontal direction of the laminated glass; and
    the predetermined distance is 20 mm to 100 mm.

2. The front windshield according to claim 1, wherein the predetermined distance is set such that a change in a reflected double image from the first display area to the second display area is 1.4 minutes or less.

3. The front windshield according to claim 2, wherein the difference between the average wedge angle of the first display area and the average wedge angle of the second display area is greater than 0.3 mrad.

4. The front windshield according to claim 1, wherein the difference between the average wedge angle of the first display area and the average wedge angle of the second display area is greater than 0.3 mrad.

5. The front windshield according to claim 1, wherein the predetermined distance is 30 mm to 100 mm.

6. The front windshield according to claim 5, wherein the predetermined distance is 50 mm to 100 mm.

7. The front windshield according to claim 1, wherein an image distance of one of the first display area and the second display area is less than 3 m, and an image distance of the other is 3 m or more.

8. The front windshield according to claim 1, wherein the average wedge angle of the first display area is greater than the average wedge angle of the second display area.

9. The front windshield according to claim 1, wherein the laminated glass is formed such that the first glass plate has a maximum depth of curvature of 10 mm or more, and such that the second glass plate has a maximum depth of curvature of 10 mm or more.

10. The front windshield according to claim 9, wherein the predetermined distance is 30 mm to 100 mm.

11. The front windshield according to claim 9, wherein the predetermined distance is 50 mm to 100 mm.

12. The front windshield according to claim 9, wherein an image distance of one of the first display area and the second display area is less than 3 m, and an image distance of the other is 3 m or more.

13. The front windshield according to claim 9, wherein the average wedge angle of the first display area is greater than the average wedge angle of the second display area.

14. The front windshield according to claim 1, wherein the transition area has a wedge angle gradually changing from the first display area to the second display area.

15. The front windshield according to claim 1, wherein the first display area has a constant wedge angle, the second display has a constant wedge angle, and the transition area has a wedge angle gradually changing from the first display area to the second display area.

16. A front windshield, comprising:
a laminated glass comprising:
- a first glass plate,
- a second glass plate, and
- an intermediate film positioned between the first glass plate and the second glass plate and bonding the first glass plate and the second glass plate, wherein:
the laminated glass has:
three or more display areas including:
- a first display area configured to be used by a head-up display for a first virtual image,
- a second display area configured to be used by the head-up display for a second virtual image, and
- a transition area formed between the first display area and the second display area such that the first and second virtual images have different image distances, and such that the transition area has a predetermined distance in a vertical direction along the laminated glass when the laminated glass is installed in a vehicle and separates the first display area and the second display area by the predetermined distance;

the laminated glass has a wedge shape in a cross section in at least one of the first display area and the second display area, such that the wedge shape has an upper edge and a lower edge, and such that a thickness of the upper edge is greater than a thickness of the lower edge, when the laminated glass is installed in the vehicle;

the laminated glass is formed such that an average wedge angle of the laminated glass in the first display area is different from an average wedge angle of the laminated glass in the second display area, and such that a difference between the average wedge angle in the first display area and the average wedge angle in the second display area is greater than 0.2 mrad;

the three or more display areas include multiple partial display areas existing in partial regions along a horizontal direction of the laminated glass;

the multiple partial display areas include the first display area existing in a first partial region along the horizontal direction of the laminated glass, the second display area existing in a second partial region along the horizontal direction of the laminated glass, or combinations thereof;

at least one of the multiple partial display areas has a center offset from a center of another of the multiple partial display areas along the horizontal direction of the laminated glass; and the predetermined distance is 20 mm to 100 mm.

\* \* \* \* \*